United States Patent [19]

Fesler

[11] Patent Number: 5,439,751

[45] Date of Patent: Aug. 8, 1995

[54] ORE PELLET COOLER SIDE PLATE

[75] Inventor: Dennis J. Fesler, Des Peres, Mo.

[73] Assignee: Carondelet Foundry Company, Pevely, Mo.

[21] Appl. No.: 175,996

[22] Filed: Dec. 30, 1993

[51] Int. Cl.$^6$ .................... B32B 15/18; B65G 17/06
[52] U.S. Cl. ................... 428/614; 428/683; 428/685; 198/853
[58] Field of Search ............ 428/614, 683, 685; 198/853, 851; 474/234

[56] References Cited

U.S. PATENT DOCUMENTS

| | | | |
|---|---|---|---|
| 3,735,858 | 5/1973 | Hartwig | 198/195 |
| 3,815,727 | 6/1974 | Hartwig | 198/230 |
| 3,863,755 | 2/1975 | Hartwig | 198/230 |
| 4,099,988 | 7/1978 | Horiuchi et al. | 428/614 |
| 5,081,774 | 1/1992 | Kuwano | 428/614 |
| 5,106,577 | 4/1992 | Fesler | 420/12 |
| 5,121,831 | 6/1992 | Fesler | 198/853 |
| 5,202,087 | 4/1993 | Culling | 420/17 |
| 5,328,776 | 7/1994 | Garber et al. | 428/614 |

OTHER PUBLICATIONS

A. D. Merriman, A Dictionary of Metallurgy, MacDonald & Evans, LTD, London, 1958, "Cast Iron—White or Chilled Irons", pp. 30–31 no month.

Metals Handbook, 9th Ed., vol. 1, "Properties and Selections: Irons and Steels", 1978, pp. 3–5, 608, 616–619 no month.

Metals Handbook, 9th Ed., vol. 3, "Properties and Selections: Stainless Steels, Tool Steels and Special Purpose Metals", 1980,* pp. 422, 423, 426, 427, 439.

Primary Examiner—John Zimmerman

Attorney, Agent, or Firm—Senniger, Powers, Leavitt & Roedel

[57] ABSTRACT

An improved cast grate cooler side plate having a bottom surface containing a metal alloy insert embedded therein wherein said insert is formed from an alloy selected from the group consisting of:

A. an alloy consisting essentially of, by weight,

| | |
|---|---|
| Carbon | about 1.5–3% |
| Chromium | about 23–30% |
| Manganese | <2.5% |
| Silicon | <2.5% |
| Nickel | up to about 3% |
| Molybdenum | up to about 3% |
| Iron | essentially the balance |

B. an alloy consisting essentially of, by weight,

| | |
|---|---|
| Carbon | about 2.5–3.6% |
| Chromium | about 1.4–3.5% |
| Manganese | about 0.4–0.7% |
| Silicon | about 0.4–0.7% |
| Nickel | about 4.0–4.75% |
| Iron | essentially the balance | and

C. an alloy consisting essentially of, by weight,

| | |
|---|---|
| Carbon | about 0.25–1.6% |
| Chromium | about 3–12% |
| Manganese | <1.5% |
| Silicon | <1.5% |
| Molybdenum | <2% |
| Vanadium | <1.5% |
| Iron | essentially the balance |

13 Claims, 3 Drawing Sheets

ORE PELLET COOLER SIDE PLATE

BACKGROUND OF THE INVENTION

This invention relates to side plates for cooling grate conveyors such as those described in U.S. Pat. Nos. 3,735,858 and 5,121,831, incorporated herein by reference thereto.

It is now established steel making practice to crush and concentrate iron ore, blend the ore with a fluxing material and form the blend into pellets. The pellets are sintered into a firm consistency at high temperature and cooled on traveling grates. The pellets are confined to the grate surfaces by traveling side plates, sometimes referred to as cooler side plates, attached to the grate conveyor chains which move the traveling grate. The bottom face of the side plates travel on steel support rails generally having a BHN hardness of about 450. Some fine grit or ore dust, which is highly abrasive, passes through the system along with the pellets and falls on the rails causing fairly rapid wear of the bottom of the plate. Additionally, the grate and side plates may operate at moderate to high temperatures and undergo continual temperature fluctuations. There is also some chemical attack by hot gases and also probably by the fluxing substances.

To try and cope with these multiple problems the grates and side plates have typically been cast from ACI type HH heat resistant alloy, which contains 24 to 28% Cr, 11 to 14% Ni, 0.2 to 0.5% C, up to about 1% each of Mn and Si, and the balance essentially Fe plus minor impurities. There is presently a trend toward using ACI type HI alloy, which contains 26 to 30% Cr, and 14 to 18% Ni, but is otherwise formulated like alloy HH. It is thought that alloy HI resists hot corrosion better and outlasts alloy HH. However, both alloys show undesirably rapid wear on the bottom edge of the side plates, resulting in a need to frequently shut down the system in order to replace the worn parts. Another method of overcoming this problem has been to bolt shoes of cast cobalt base alloys, which typically contain about 0.6 to 2% C, about 30% Cr plus 4.5% or more W and oftentimes about 1.5% Mo, to plates made from alloy HH or alloy HI. But, since cobalt is a relatively scarce element these cobalt-base alloy shoes are quite expensive. Also, they tend to crack and fall off during use, and the hand fitting and bolting required increases the expense of this method considerably. Thus, it remains highly desirable to find a more practical but far less costly method of overcoming the side plate wear problem.

One possible solution to these problems which was considered was to cast the side plate around some type of wear bar, composed of a material that would have high hot hardness and ability to resist hot abrasion. In order for such a wear bar to function successfully it would have to remain firmly in place and not crack, fragment, spall or melt in service. While many possible candidate materials such as ceramic oxides, borides, nitrides, silicides and cemented carbides, high carbon cobalt-chromium base alloys, high-carbon nickel-chromium alloys, high-carbon nickel-chromium-iron alloys, high-boron nickel-base alloys, would appear to be useful because of their hardness, it was found that such materials do not possess many other properties required. For example, the ceramic oxides were too brittle and susceptible to thermal and mechanical cracking and falling out of place. Further, ceramic borides, nitrides and silicides are generally far more costly to produce and have properties quite similar to the oxides in terms of early mechanical failure. Cemented tungsten, molybdenum and titanium carbides, which are commercially available, found to be far too costly for further consideration. Cast wear bars of cobalt-chromium-tungsten-molybdenum wear-resistant alloys tend to crack when the side plates are cast around them. Also, there is no practical method of separating these cobalt alloys from the surrounding side plate castings when scrap or defective castings are produced or for purposes of recycling used castings. Additionally, the cobalt-base alloy remains excessively expensive.

Fesler, U.S. Pat. No. 5,106,577 and Culling, U.S. Pat. No. 5,202,087 disclose high-carbon austenitic steels to meet similar hot corrosion and abrasion conditions in cement cooler grates. Both of these alloys displayed outstanding hot abrasion and corrosion resistance but had a high tendency to crack in service due to their relatively poor resistance to thermal shock and fatigue. Also, inserts cast from those alloys tend to crack and/or come loose during the process of casting the side plates around the wear bar inserts. Cast high-carbon martensitic alloys such as the 15% Cr-3% Mo type, proved to be extremely brittle in this application. These alloys contain large amounts of hard, brittle carbides in a very brittle martensitic matrix.

SUMMARY OF THE INVENTION

Accordingly, it has now been found that the problems associated with the various attempts to improve the life of pellet cooler side plates can be overcome by a side plate containing a cast in place hard metallic insert or wear bar comprised of one of three alloy compositions hereinafter described.

It is therefore an object of the invention to provide a heat, corrosion and abrasion resistant cast composite sintered iron ore pellet cooler side plate which has excellent resistance to bottom edge abrasive wear. It is a further object to provide a cooler side plate which is resistant to failure in the service conditions encountered thereby providing a significant improvement in service life over the service life of previous cooler plates. It is therefore an object to provide cooler side plates which have a wear life about the same as other items comprising the cooler grates system. It is a further object of the invention to provide a plate that is air meltable and castable which contains a cast in place hard metallic insert or wear bar composed of a relatively low cost iron-base alloy selected from the group consisting of highcarbon high-chromium white cast iron, low-nickel, low-chromium white cast iron and low-carbon to medium-carbon tool steels. A further object of the invention is to provide long wearing cooler plates which can be recycled after use to produce new cooler plates or other cast iron items without concern for the composition of the alloy used in the insert.

DETAILED DESCRIPTION OF THE INVENTION

Figure 1:
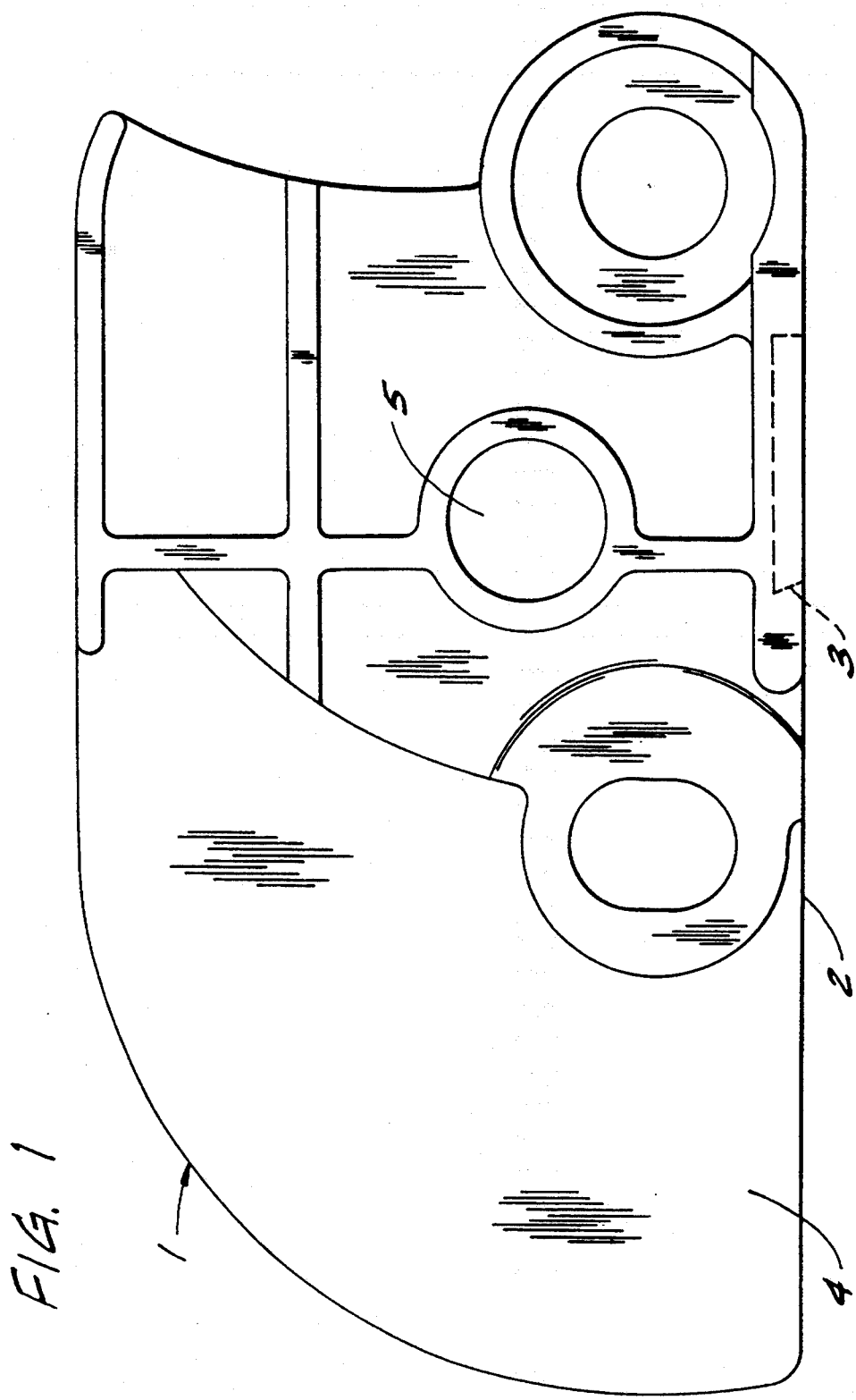
FIG. 1 is side elevation view of a cooler side plate of the invention.

Referring to FIG. 1, there is shown a cooler side plate generally indicated at 1 which is of the type used to retain material to be cooled (e.g., sintered pellets) on cooler grates of a cooler grate conveyor, as described above and well known to those of ordinary skill in the art. The cooler side plate 1 is a casting of a suitable alloy, such as ASI alloys HH or HI, having an upstanding retaining wall 4 which projects above the cooler grates of the cooler grate conveyor (not shown) and holds the material on the conveyor and prevents it from spilling over the sides of the conveyor. Opening 5 in the retaining wall 4 receives connecting rods (not shown) for connection of the side plate to a grate or link of the conveyor. In practice, a plurality of side plates are connected end to end along each side of the conveyor to form a continuous wall (not shown) while permitting the individual side plates to pivot relative to each other as the conveyor traverses its circuitous path. A bottom surface or edge 2 of the side plate 1, which slides on a rail (not shown) supporting the side plate, cooler grates and load on the cooler grates, contains a metal insert or wear bar 3.

Figure 3:
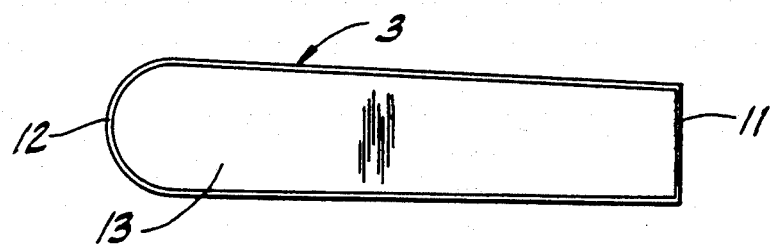
FIG. 3 is a top plan view of a typical configuration of an insert or wear bar used in the cooler side plate of the invention.
Figure 4:
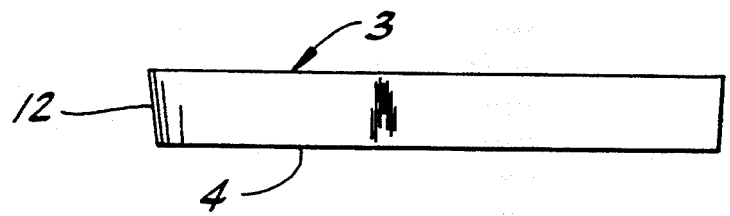
FIG. 4 is a side elevation view of the insert of FIG. 3.

In FIGS. 3 and 4 the insert or wear bar 3 is shown in an embodiment in which there is a flat, rectangular end 11 a curved end 12 and in which the top face 13 is slightly larger than the bottom face 4. End 12 is shown as inclined or tapered. This particular configuration is not an essential part of the invention but illustrates a typical design of an insert following usual foundry practices relating to the requirements for ease of casting the insert and its removal from the mold.

Figure 2:
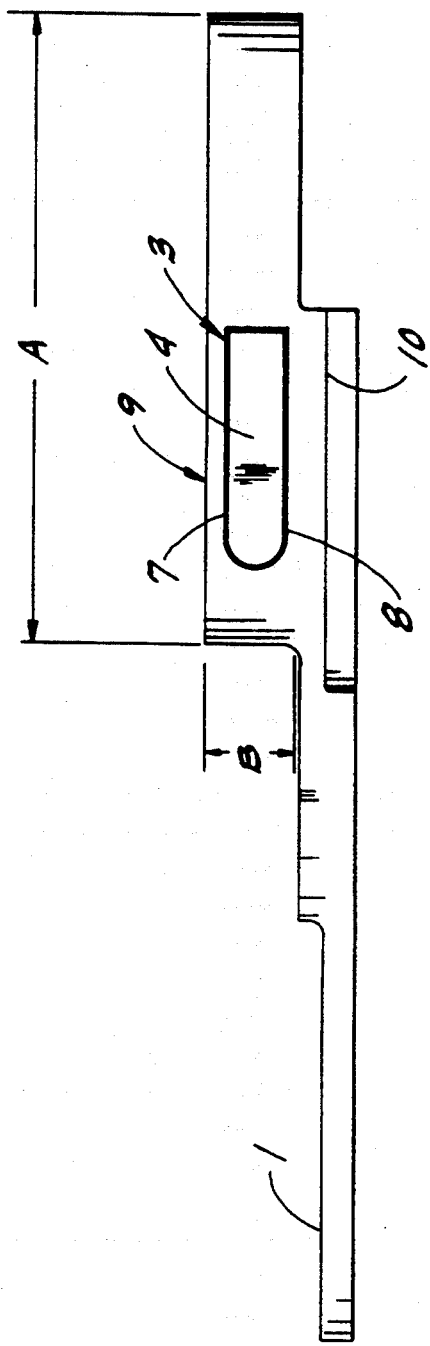
FIG. 2 is a bottom plan view of a cooler plate of the invention.

As shown in FIG. 1 insert 3 is disposed in plate 1 so that the bottom surface of the insert, indicated by 4, is generally flush with the bottom of the plate. FIG. 2 shows the position of insert 3 in cast plate 1 when plate 1 is viewed from the bottom. While the insert does not have to be in the same relative position as shown in FIG. 2 it is important that the insert be at least about 3/16 inches from any wall of the plate to insure that metal freeze does not occur until the openings in the mold are filled. Thus, for example, the spacing of sides 7 and 8 of insert 3 from the respective edges of plate 1, indicated by 9 and 10, should be at least about 3/16 inches. In addition, the insert should be of adequate dimensions to withstand the pressure loading generated by the weight of the ore pellets or other material (not shown) on the cooler grates (not shown). Since there are different shapes and sizes of cooler plates there is not a standard size insert. However, the dimensions of the insert may be calculated and/or determined in the field taking into account not only the specific configuration of the cooler plate but other factors known to those skilled in the art such as the pressure loading on the insert created by the pellets on the cooler grate. It has been found for example that for a cooler plate of the type generally shown by FIGS. 1 and 2, dimension A of FIG. 2 is about 10.5 inches and dimension B is about 2 inches or slightly less, an insert in which face 4 is about 1×4 inches provides the necessary wear surface to meet the requirements discussed above. In addition, it has been found that for an insert having a face of those dimensions, the dimensions of side FIG. 4 would be about 4×½ inches to insure that the insert possesses the necessary physical properties to provide a long wearing surface.

According to the present invention, the heat-resistant iron ore pellet cooler side plate is prepared by casting a melt of an austenitic heat-resistant alloy, such as ASI alloy type HH or HI, in a mold which contains a cast metal insert of the selected wear resistant alloy type, whereby the insert fuses or welds to the plate, thus becoming embedded in the plate, during casting of the plate.

More particularly, the cooler plate is prepared by placing an insert in the plate mold in the desired position. The insert or wear bar can be retained in the plate mold during the casting of the plate by various means known to the art, such as cementing, using a removable lug (not shown) extending from face 4 of the insert or by the use of other removable projections extending from face 4, such as pins (not shown).

The most preferred cast insert alloy is a high-carbon high-chromium white cast iron, which is useful up to temperatures of about 1500° F., containing by weight about 1.5% to 3.0% C, about 23% to 30% Cr and the balance essentially iron plus the usual impurities and ordinary deoxidizing elements, Mn and Si, in quantities of the order of about 2.5% or less each. It has been found that up to about 3% added Mo increases the high temperature stability of carbides without an undesired decrease in brittleness and that up to about 3% added Ni toughens the alloy without requiring the further addition of carbon. A typical composition providing excellent compatibility, function and service in this application is one having about 2.4% C, about 25% Cr, about 1% each of Mn and Si and the balance essentially iron. This alloy consists primarily of fine primary and secondary carbides embedded in a matrix of mostly ferritic or body-center-cubic crystal structure. The alloy has a relatively low coefficient of thermal expansion and retains excellent hot hardness and abrasion resistance up to temperatures of the order of 1500° F. It also readily fuses or welds firmly to the side plate metal during the casting process, and its properties are essentially undiminished by the thermal effects of the casting process. The alloy provides outstanding abrasion resistance when present as a cast insert wear bar, such as depicted in FIG. 1, and, because of its elemental content, may simply be ignored during scrap reprocessing and remelting or recycling of used side plates after extended service.

If service conditions in a particular cooler installation do not require severely rapid or localized heating and cooling cycles, and the temperature of the insert does not exceed about 1200° F., a nickel-chromium cast white iron widely known in the industry by the trade name Ni-Hard, may be employed in place of the high-carbon, high-chromium white iron described above. This iron contains about 2.5% to 3.6% C, 0.4% to 0.7% Si, 0.4% to 0.7% Mn, 4.0% to 4.75% Ni, 1.4% to 3.5% Cr, and the balance essentially iron plus small amounts of ordinary impurities such as S and P. A preferred alloy is one having about 3% C, about 2.3% Cr, about 0.5% Mn, about 0.6% Si, about 4.25% Ni and the balance Fe. The hardness of a Ni-Hard alloy containing about 3.0% C, 4% Ni, 3% Cr and the balance iron was found to range from about 600 BHN at 70° F. to 330 BHN at 1200° F., falling to 190 BHN at 1400° F. This white iron is said to be martensitic, but, in fact, typically contains some austenite and perhaps other structures aside from carbides. It has also been found to fuse or weld, that is bond, readily to the surrounding side plate metal during casting and to remain solidly fused after cooling from the melt. As contrasted to the preferred high-carbon, high-chromium iron above, this white iron has a tendency to crack if rapidly cooled from high temperature. However, it is suitable for service in installations in which severe, rapid heating and cooling are avoided. Also, this insert may be ignored during remelting of scrap or recycled side plates.

The third type of alloy that may be successfully employed as the insert is a tool or die steel of the low-carbon, low-alloy content type having about 3%–12% Cr, preferably about 5% Cr, <2% Mo, <1.5% V, and the balance iron. Small amounts of Si and Mn, <1.5%, may also be present. The carbon content is in the range of about 0.25%–1.6%, preferably about 0.4%–1.5%. These steels are sometimes referred to as a hot work or cold work die steels, depending upon their carbon content. See ASM Handbook For Tool Steels, Roberts, Hamaker and Johnson, 3rd edition, (1962), pages 243–247, incorporated herein by reference thereto. Lastly, certain of the steels referred to as cold work die steels have been found to be especially useful for the inserts provided that they have a carbon content of about 0.75–1.6%. These steels are listed in the ASM Handbook and are known as steels D-1, D-2 and D-5 according to the AISI naming system. Even though these steels may be heated to fully martensitic matrix structures, they are not nearly as brittle as the high-carbon martensitic cast alloys discussed above. They also may be cast into the side plates with good fusion and no excess tendency to crack. They are suitable for service in which the insert surface temperature does not exceed about 1200° F. and can be ignored during remelting of scrap or recycled castings.

A preferred hot work tool steel is one known as type H-13 which has the following composition by weight:

| | |
|---|---|
| Carbon | 0.40% |
| Chromium | 5.0% |
| Manganese | 0.30% |
| Silicon | 1.00% |
| Molybdenum | 1.35% |
| Vanadium | 1.00% |
| Iron | essentially the balance |

A preferred cold work tool steel is one known as type D-2 which has the following composition by weight:

| | |
|---|---|
| Carbon | 1.50% |
| Chromium | 12.0% |
| Manganese | 0.3% |
| Silicon | 0.25% |
| Molybdenum | 0.8% |
| Vanadium | 0.6% |
| Iron | essentially the balance |

Surprisingly, those steels listed in the ASM Handbook and referred to as high speed and super high speed tool steels are not suitable as insert materials in this application due to excessive cracking in service. They also present other problems such as dendritic segregation when prepared for use as insert castings. A further major factor opposing the use of these high speed steels is that the hardness of those steels cannot be controlled to levels of the order of about 450 Brinell Hardness Number (BHN) or 45 Rockwell C (RC) maximum which is the hardness of the cooler rails which support the traveling side plates. If the cast hard wear bar inserts exceed about 450 BHN (45 RC) (as operating temperatures, and therefore the insert temperatures, vary) the rails will wear out instead of the inserts. The same concern exists with respect to the high carbon 15% Cr-3% Mo type alloys, the cemented carbides, the cast Co—Cr—W—Mo wear resistant alloys, the oxide, boride, nitride or silicide refractories, and even the Ni-Hard type cast white irons. For example, the ceramics have hardnesses on the order of 900 to 1500 BHN; the cast Co—Cr—W—Mo alloys (known widely in the trade as Stellites) typically have hardnesses of 450 to 680 BHN, depending upon type; the high speed steels have hardnesses of about 630 BHN; and the 15% Cr-3% Mo cast alloys have hardnesses of about 600 to 650 BHN.

In contrast, the hardness level of the cast inserts prepared from the preferred high-carbon, high-chromium alloys is readily controlled by adjustment of their carbon content. For example, at about 2.4% C content the room temperature hardness of the insert is about 550 to 640 BHN as cast in the end plate. Because the side plate casting heats somewhat from direct contact with the hot pellets, the insert is also heated, typically up to about 1200° F. in service. At that temperature the insert would have a hardness of about 400 BHN. If an insert of about 2.4% C nevertheless proves to cause excessive rail wear the room temperature and operating temperature hardness of the insert can be readily controlled in this alloy by reducing carbon level. For example, if the operating temperature of the bottom surface of the insert in a given operation, that is, the surface in contact with the rails, proves to be about 1000° F., a carbon content of about 1.9% in the insert casting would result in the insert having a surface hardness of about 450 BHN at that temperature. About 1.8% C would result in a hardness of about 350 BHN at about 1000° F. In the case where Ni is present in the alloy less carbon is required to achieve a desired hardness. For example, if Ni is present in the high-carbon, high-chromium alloy at a level of about 2% to 6.5%, then a carbon level of about 1.5% would result in a wear surface hardness of the insert of about 450 BHN.

Since the operators of pellet coolers seldom know exact operating temperatures, which may be difficult to measure accurately and which generally fluctuate to some extent, actual tests may be necessary to arrive at the best performing alloy composition for a specific installation. With the high-carbon high-chromium alloys, however, the desired operating hardness of the wear bar insert is easily controlled by adjusting carbon content.

The hardness values for the Ni-Hard type white cast irons are only moderately affected by carbon content. Thus, there is not nearly as much control over insert wear hardness in this alloy type. The final hardnesses of the low alloy tool steel types may be controlled somewhat by adjustment of the carbon level and/or other alloying element content. But those alloys are also not as readily and precisely controllable as the high-carbon, high-chromium alloys. Therefore, the latter alloys remain the alloy of choice where various hardness levels are required.

In preparing a cooler plate of this invention the insert or wear bar is first cast following typical foundry practice. To cast the cooler plate the cast insert is placed in the desired position in the plate mold and a melt of the desired alloy is poured in the plate mold whereby the alloy surrounds the sides and top of the insert and, upon cooling, results in the insert becoming fused into the plate. If pins, lugs or other protrusions are employed to hold the insert in position during the plate molding operation they are removed after the plate containing the insert is removed from the mold.

To further illustrate the invention wear bars containing inserts of the preferred high-carbon high-chromium alloy and having a range of carbon contents of from about 1.6% to 2.8% were cast. Each insert contained 23-30% Cr, <1% Ni, <1% Mn, and <1.5% Si with the balance iron. The Brinell hardness of each insert was measured at room temperature (70° F.) and at temperatures of 800° F., 1000° F., 1200° F. and 1400° F. A temperature range of 800°-1200° F. approximates the range of operating temperatures likely to be encountered in typical plant operations. The hardness values measured for the various inserts are set forth below in Table 1.

TABLE 1

| | BHN AT VARIOUS TEMPERATURES | | | | |
|---|---|---|---|---|---|
| % Carbon Content | 70° F. | 800° F. | 1000° F. | 1200° F. | 1400° F. |
| 2.8 | 630 | 560 | 500 | 450 | 350 |
| 2.6 | 600 | 530 | 470 | 430 | 325 |
| 2.4 | 570 | 500 | 450 | 400 | 300 |
| 2.2 | 520 | 460 | 415 | 370 | 275 |
| 2.0 | 485 | 425 | 380 | 340 | 250 |
| 1.8 | 445 | 390 | 350 | 310 | 225 |
| 1.6 | 410 | 360 | 320 | 280 | 200 |

As various changes could be made in the above construction and method without departing from the spirit and scope of the invention, it is intended that all matter contained in the above description or shown in the accompanying views of the drawings shall be interpreted as illustrative and not in a limiting sense.

What is claimed is:

1. An improved cast grate cooler side plate having a bottom surface containing a metal alloy insert embedded therein wherein said insert is formed from an alloy selected from the group consisting of:
   A. an alloy consisting essentially of, by weight,

| Carbon | about 1.5-3% |
   |---|---|
   | Chromium | about 23-30% |
   | Manganese | <2.5% |
   | Silicon | <2.5% |
   | Nickel | up to about 3% |
   | Molybdenum | up to about 3% |
   | Iron | essentially the balance |

B. an alloy consisting essentially of, by weight,

| Carbon | about 2.5-3.6% |
   |---|---|
   | Chromium | about 1.4-3.5% |
   | Manganese | about 0.4-0.7% |
   | Silicon | about 0.4-0.7% |
   | Nickel | about 4.0-4.75% |
   | Iron | essentially the balance | and
   C. an alloy consisting essentially of, by weight,

| Carbon | about 0.25-1.6% |
   |---|---|
   | Chromium | about 3-12% |
   | Manganese | <1.5% |
   | Silicon | <1.5% |
   | Molybdenum | <2% |
   | Vanadium | <1.5% |
   | Iron | essentially the balance |

2. A cooler plate of claim 1 wherein the insert is formed from an alloy of alloy A.

3. An alloy of claim 2 wherein the alloy contains about 2.4% carbon.

4. An alloy of claim 2 wherein the alloy has a composition of about 2.4% C, about 25% Cr, about 1% Mn, about 1% Si and the balance essentially Fe.

5. A great cooler side plate of claim 1 wherein the insert is formed from an alloy of alloy B.

6. An alloy of claim 5 wherein the alloy consists essentially of:

| Carbon | about 3% |
|---|---|
| Chromium | about 2.3% |
| Manganese | about 0.5% |
| Silicon | about 0.6% |
| Nickel | about 4.25% |
| Iron | essentially the balance |

7. An alloy of claim 5 wherein the chromium content is about 2.3%.

8. An alloy of claim 1 wherein the cooler side plate is cast from ASI alloy type HH.

9. An alloy of claim 1 wherein the cooler side plate is cast from ASI alloy type HI.

10. An alloy of claim 1 wherein the insert is formed from an alloy of alloy C.

11. An alloy of claim 10 wherein the carbon content is in the range of about 0.4% to 1.5% C.

12. An alloy of claim 11 wherein the alloy has a composition consisting essentially of:

| Carbon | 0.4% |
|---|---|
| Chromium | 5.0% |
| Manganese | 0.30% |
| Silicon | 1.00% |
| Molybdenum | 1.35% |
| Vanadium | 1.00% |
| Iron | essentially the balance |

13. An alloy of claim 11 wherein the alloy has a composition consisting essentially of:

| Carbon | 1.50% |
|---|---|
| Chromium | 12.0% |
| Manganese | 0.3% |
| Silicon | 0.25% |
| Molybdenum | 0.8% |
| Vanadium | 0.6% |
| Iron | essentially the balance |

* * * * *